United States Patent
Liu et al.

(10) Patent No.: US 6,208,442 B1
(45) Date of Patent: *Mar. 27, 2001

(54) PROGRAMMABLE OPTICAL MULTIPLEXER

(75) Inventors: Jian-Yu Liu; Kuang-Yi Wu; Charles Wong, all of Boulder, CO (US)

(73) Assignee: Chorum Technologies, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/048,557

(22) Filed: Mar. 26, 1998

(51) Int. Cl.[7] .................................................. H04J 14/02
(52) U.S. Cl. ................................................ 359/127; 359/122
(58) Field of Search ................................. 359/127, 122, 359/124, 130

(56) References Cited

U.S. PATENT DOCUMENTS

| | | | |
|---|---|---|---|
| 3,501,640 | 3/1970 | Harris | 250/199 |
| 4,461,543 | 7/1984 | McMahon | 350/383 |
| 4,650,289 | 3/1987 | Kuwahara | 350/375 |
| 4,720,171 | 1/1988 | Baker | 350/331 |
| 4,919,522 | 4/1990 | Nelson | 359/246 |
| 4,989,941 | 2/1991 | Soref | 350/96.18 |
| 5,013,140 | 5/1991 | Healey et al. | 350/347 |
| 5,162,944 | 11/1992 | Yamamoto et al. | 359/247 |
| 5,165,104 | 11/1992 | Weverka | 385/7 |
| 5,305,136 | 4/1994 | Smith | 359/247 |
| 5,317,658 | 5/1994 | Bergland et al. | 385/16 |
| 5,363,228 | 11/1994 | DeJule et al. | 359/117 |
| 5,381,250 | 1/1995 | Meadows | 359/39 |
| 5,414,541 | 5/1995 | Patel et al. | 359/39 |

(List continued on next page.)

FOREIGN PATENT DOCUMENTS

| | | | |
|---|---|---|---|
| 0 762 690 A2 | 3/1997 | (EP) | H04J/14/02 |
| PCT/IL96/00079 | 8/1996 | (WO) | |
| WO 97/09536 | 3/1997 | (WO) | |

OTHER PUBLICATIONS

PCT Written Opinion; PCT/US99/06736; dated Apr. 18, 2000.

Saleh, A.A.M. and J. Stone; Two–Stage Fabry–Perot Filters as Demultiplexers in Optical FDMA LAN's; Journal of Lightwave Technology; vol. 7, No. 2, Feb. 1989; pp. 323–329.

Chung, Youngchul, Jong Chang Yi, Sun Ho Kim, and Sang Sam Choi; Analysis of a Tunable Multichannel Two–Mode–Interference Wavelength Division Multiplexer/Demultiplexer; Journal of Lighwave Technology; vol. 7, No. 5; May 1989; pp. 766–777.

Takahashi, Hiroshi, Senichi Suzuki and Isao Nishi; Wavelength Multiplexer Based on $SiO_2$–$Ta_2O_5$ Arrayed–Waveguide Grating; Journal of Lightwave Technology; vol. 12, No. 6, Jun. 1994; pp. 989–995.

Damask, Jay N. and Hermann A. Haus; Wavelength–Division Multiplexing using Channel–Dropping Filters; Journal of Lighwave Technology; vol. 11, No. 3; Mar. 1993; pp. 424–428.

(List continued on next page.)

*Primary Examiner*—Leslie Pascal
(74) *Attorney, Agent, or Firm*—Sheridan Ross P.C.

(57) ABSTRACT

An optical wavelength division multiplex (WDM) demultiplexer can be provided in substantially passive form. In one embodiment a wavelength filter separates alternate channels to provide a first output containing even-numbered channels and a second output containing odd-numbered channels, each output having channels separated by a bandwidth twice the channel separation bandwidth of the original WDM signal.

24 Claims, 13 Drawing Sheets

U.S. PATENT DOCUMENTS

| | | | |
|---|---|---|---|
| 5,596,661 | 1/1997 | Henry et al. | 385/24 |
| 5,680,490 | 10/1997 | Cohen et al. | 385/24 |
| 5,694,233 | 12/1997 | Wu et al. | 359/117 |
| 5,740,288 | 4/1998 | Pan | 385/11 |
| 5,809,190 | 7/1998 | Chen | 385/43 |
| 5,867,291 | 2/1999 | Wu et al. | 359/124 |
| 5,912,748 | 6/1999 | Wu et al. | 359/117 |
| 5,946,116 | 8/1999 | Wu et al. | 359/117 |
| 5,963,291 | 10/1999 | Wu et al. | 349/196 |
| 5,978,116 | 11/1999 | Wu et al. | 359/124 |
| 6,005,697 | 12/1999 | Wu et al. | 359/117 |
| 6,144,494 | 11/2000 | Shirasaki et al. | 359/578 |

OTHER PUBLICATIONS

Smith, D.A., M.M. Choy, A. d'Alessandro, J.E. Baran and A.W. Rajhel; Cascaded Acoustooptic/Fiber Fabry–Perot Filter With Finesse Over 2000; IEEE Photonics Technology Letters; vol. 5 No. 2; Feb. 1993; pp. 189–191.

Hirabayashi, Katsuhiko, Hiroyuki Tsuda and Takashi Kurokawa; Tunable Wavelength–Selective Liquid Crystal Filters for 600–Channel FDM System; IEEE Phtonics Technology Letters; vol. 4, No. 6, Jun. 1992; pp. 597–599.

Senior, J.M. and S.D. Cusworth; Devices for wavelength multiplexing and demultiplexing; IEE Proceedings; vol. 136, Pt.J, No. 3; Jun. 1989; pp. 183–202.

Inoue, Kyo, Norio Takato, Hiromu Toba and Masao Kawachi; A Four–Channel Optical Waveguide Multi/Demultiplexer for 5–GHz Spaced Optical FDM Transmission; Journal of Lightwave Technology; vol. 6, No. 2; Feb. 1988; pp. 339–345.

Kuznetsov, M.; Cascaded Coupler Mach–Zehnder Channel Dropping Filters for Wavelength–Division–Multiplexed Optical Systems; Journal of Lightwave Technology; vol. 12, No. 2; Feb. 1994; pp. 226–230.

Nosu, Kiyoshi, Hiromu Toba and Katsushi Iwashita; Optical FDM Transmission Technique; Journal of Lightwave Technology; vol. Lt–5, No. 9; Sep. 1987; pp. 1301–1307.

Takato, Norio; Toshimi Kominato, Akio Sugita, Kaname Jinguji; Hiromu Toba and Masao Kawachi; Silica–Based Integrated Optic Mach–Zehnder Multi/Demultiplexer Family with Channel Spacing of 0.01–250 nm; IEEE Journal on Selected Areas in Communications; vol. 8(6), Aug. 1990; pp. 1120–1127.

Verbeek, B.H, C.H. Henry, N.A. Olsson, K.J. Orlowsky, R.F. Kazarinov and B.H. Johnson; Integrated Four–Channel Mach–Zehnder Multi–Demultiplexer Fabricated with Phosphorous Dopes $SiO_2$ Waveguides on Si; Journal of Lightwave Technology; Jun. 1988; pp. 1011–1015.

Derr, Frowin, Manfred N. Huber, Guenther Kettler and Norbert Thorweihe; An Optical Infrastructure for Future Telecommunications Networks; IEEE Communications Magazine; No. 11; Nov. 1995; pp. 84–88.

E.O. Ammann, "Synthesis of Electro–Optic Shutters having a Prescribed Transmission vs. Voltage Characteristic", *Journal of the Optical Society of America*, vol. 56, No. 8, pp. 1081–1088 (Aug. 1966).

Ammann et al., "Optical Network Synthesis Using Birefringent Crystals. synthesis of Lossless Networks of Equal–Length Crystals", *Journal of th Optical Society of America*, vol. 54, No. 10, pp. 1267–1279 (Oct. 1964).

S. Kuroyanagi et al.; "Optical Cross–Connect Architecture Using Free–space Optical Switches Based on PI–Loss Topology"; IEEE; 1995; pp. 2112–2117.

Noguchi et al.; "A Rearrangeable Multichannel Free–Space Optical Switch Based on Multistage Network Configuration"; Journal of Lightwave Technology; *vol. 9, No. 12*, Dec. 1991; pp.1726–1732.

Peng et al.; "Optical Implementation of Regular Rectangular CC–Banyan Network by Using Polarizing Beam Splitters", *Optics Communications*; *vol. 117*; 1995; pp. 37–42.

Spectral Response of Wavelength Slicing

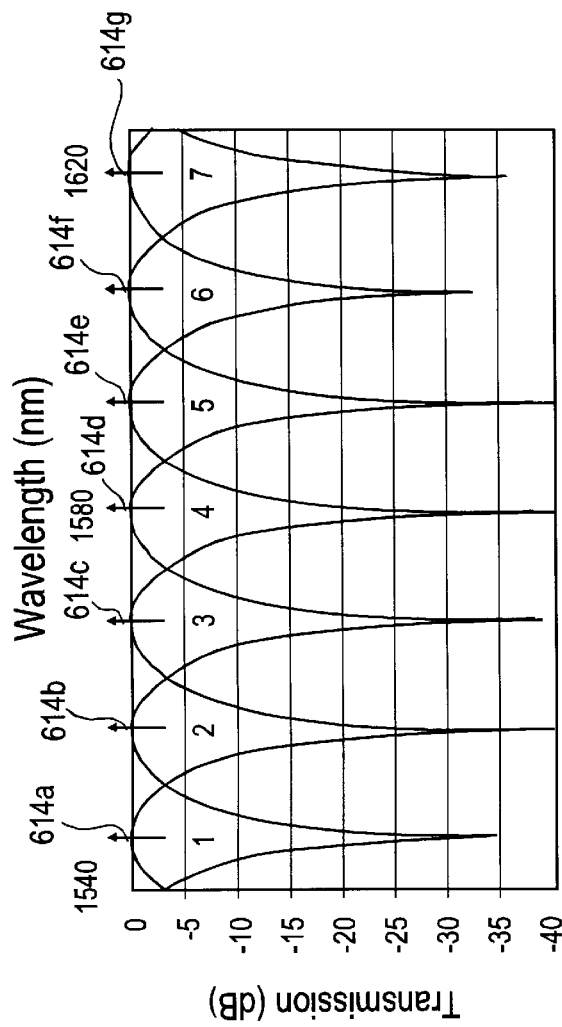
FIG. 6A
Prior Art
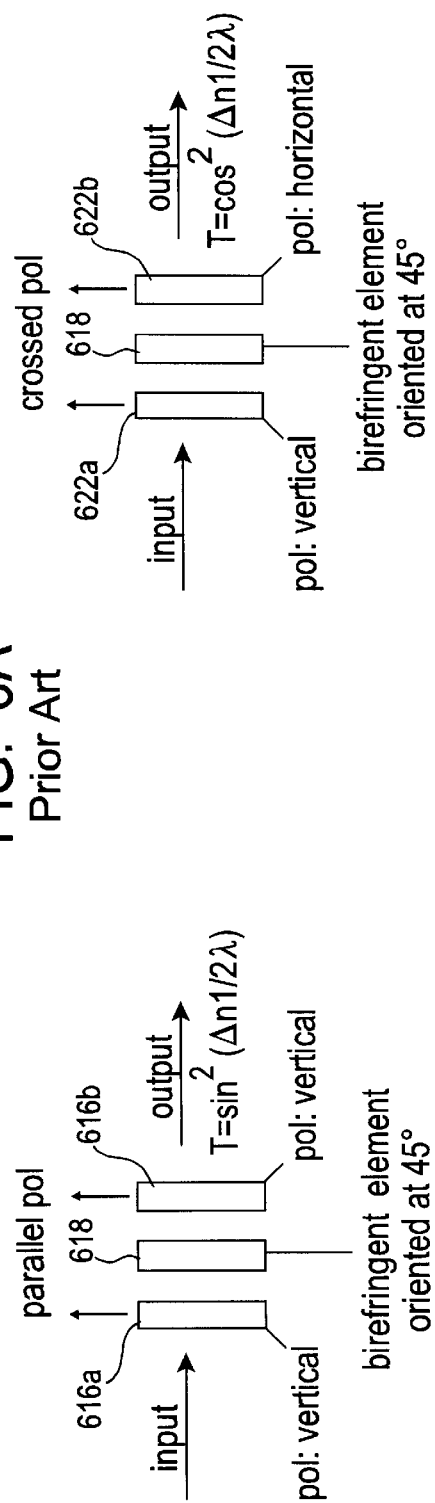
FIG. 6B
FIG. 6C

PROGRAMMABLE OPTICAL MULTIPLEXER

Cross-reference is made to U.S. Pat. No. 5,694,233 entitled "Switchable Wavelength Router," U.S. patent application Ser. No. 08/739,424 entitled "Programmable Wavelength Router" filed Oct. 29, 1996, and U.S. patent application Ser. No. 60/043,012 entitled "N×M Optical Wavelength Routing Switch", all incorporated herein by reference.

FIELD OF THE INVENTION

The present invention relates, in general, to communication systems and, particularly, to an optical wavelength multiplexer/demultiplexer usable in connection with wavelength division multiplex (WDM) optical communication.

BACKGROUND OF THE INVENTION

A number of optical communication devices and systems are configured for use with optical wavelength division multiplexing (WDM). In WDM, several information signals can be transmitted over a single optical fiber. Each information signal is used to modulate a different wavelength carrier signal or channel. Many operations in such systems require multiplexing or demultiplexing the signals. Multiplexing generally involves combining multiple channels into a single WDM signal. Demultiplexing generally involves extracting or separating individual channels, e.g. for subsequent processing such as routing to desired pathways and/or outputting to output ports. Each channel occupies or is contained within a predefined frequency range. In many (but not all) systems the frequency ranges defining the boundaries for the channels are equal in bandwidth, evenly spaced and contiguous. Since the total bandwidth for a WDM signal cannot be significantly smaller than the sum of the bandwidths of the component channels, for a given bandwidth WDM signal, the number of channels that can be defined (and thus the number of separate information signals that can be carried) increases as the bandwidth of the channels decreases. Thus it is not surprising that systems have tended toward increasingly-smaller channel spacing to increase the number of optical channels. Many systems would, accordingly, benefit from optical devices which can successfully accommodate channel bandwidths of, for example, 100 GHz, 50 GHz or even less.

Unfortunately, as the number of channels is increased, the channel spacing is decreased so that functions such as demultiplexing/multiplexing have become increasingly difficult. In addition to the difficulty of constructing devices with sufficient accuracy to, even theoretically, demultiplex such narrow-bandwidth channels, and without wishing to be bound by any theory, it is believed narrow-bandwidth demultiplexing is particularly susceptible to factors such as wavelength drift and/or channel cross-talk.

Accordingly, it would be useful to provide a demultiplexer/multiplexer which can provide useful results with respect to narrow-bandwidth channels such as 100 GHZ, 50 GHz channels or smaller, preferably while being relatively tolerant of wavelength drift and/or providing relatively low channel cross-talk.

It is, in general, believed possible to construct devices which permit channels to be controllably provided to desired output ports (i.e. routers) and/or permit a new information signal to replace an existing information signal in a channel of a WDM (i.e. an add/drop device). It is believed some such devices involve active (i.e. controlled) channel separation in which binary or other control signals function to achieve the desired routing or add/drop configuration. It is believed that many such systems are configured such that a change in the control signals (i.e. a change in routing or add/drop function) affects (e.g. interrupts or "touches") all or substantially all of the channels in the WDM signal. While this may be acceptable for some applications, it is believed other applications (such as asynchronous, continuous, real time and/or time critical signals) would be more readily served by devices which permitted re-routing or add/drop changes of only desired channels while leaving other channels in a WDM signal substantially unchanged or untouched.

Accordingly, it would be useful to provide a demultiplexer/multiplexer, and associated devices such as add/drop devices, routers, and the like, particularly narrow-bandwidth channel systems, in which the multiplex /demultiplex function was substantially passive and/or in which channels not being changed by a change in routing or add/drop function would be substantially unaffected or untouched.

SUMMARY OF THE INVENTION

The present invention includes a recognition of problems of previous approaches, including as described above. The present invention involves a wavelength filter which operates by providing different polarizations to contiguous channels. Thus, if a plurality of channels are, in order, assigned sequential numbers, odd-numbered channels will be provided with a first polarization while even numbered channels are provided with a second polarization. Such change in polarization permits the odd-numbered and even-numbered channels to be placed on different optical paths. In this way, the present invention provides for a single device or stage that separates a plurality of non-contiguous channels, all at once, from remaining channels. The separation of formerly "interdigitated" channels means that the channels in each path are separated by a channel spacing twice the separation between channels of the original WDM signal (for the typically evenly-spaced channels). The system is scalable in the sense that each of the two resulting double-spaced channel signals can be further separated into, e.g., two signals containing alternately-numbered channels which are quadruply spaced. For example, an original WDM signal has channel separation of 100 Gigahertz (GHz), a first iteration of a wavelength filter as described herein will result in two signals (one carrying channels 1, 3, 5, 7 . . . , the other carrying channels 2, 4, 6, 8 . . . ) with the channels of each of the two signals being separated by 200 GHz. A second iteration of wavelength filtering (using a different filter, as described below) will result in two signals arising from each of the first and second filtered signals, for a total of four signals (the first having channels 1, 5, 9 . . . , the second having channels 3, 7, 11 . . . , the third having channels 2, 6, 10 . . . , the fourth having channels 4, 8, 12 . . . ) with the channels in each of these four signals being separated from adjacent channels by 400 GHz. The process may be repeatedly iterated sufficiently to achieve the desired separation of channels. For example it is at least theoretically possible to iterate until there is one channel per signal (i.e. the WDM signal has been fully demultiplexed) using the described wavelength filters, or more conventional demultiplexing devices (conventional wavelength filtering) and methods can be applied to resultant signals (502, 503 or 504, 505, 506, 507, or the like) in which the increased channel separation permits successful application of conventional demultiplexing technology, preferably with acceptable wavelength drift tolerance and acceptably low cross talk.

Although a "channel" may refer to a single frequency range used to carry a single information signal, it is possible to decompose or demultiplex a WDM signal only partially such that one or more of the outputs of the demultiplexer may include more than one channel and may itself be a WDM signal (with a smaller bandwidth than the original WDM signal).

Because the demultiplexing is provided in the absence of control signals and is substantially passive, the demultiplexed signals are provided as substantially continuous, uninterrupted signals. Accordingly, in one embodiment the demultiplexer can be used in conjunction with other devices to achieve, e.g., add/drop functionality in a manner such that changing the add/drop function (such as providing an add signal to a different channel) can be achieved without affecting, interrupting or "touching" any of the channels other than those involved in the change.

BRIEF DESCRIPTION OF THE DRAWINGS

FIG. 6A depicts the transmission spectra of a single birefringent element placed between crossed and parallel polarizers;

FIGS. 6B and C schematically depict devices with a single birefringent element placed between parallel and crossed polarizers, respectively;

DETAILED DESCRIPTION OF THE PREFERRED EMBODIMENTS

Figure 1:
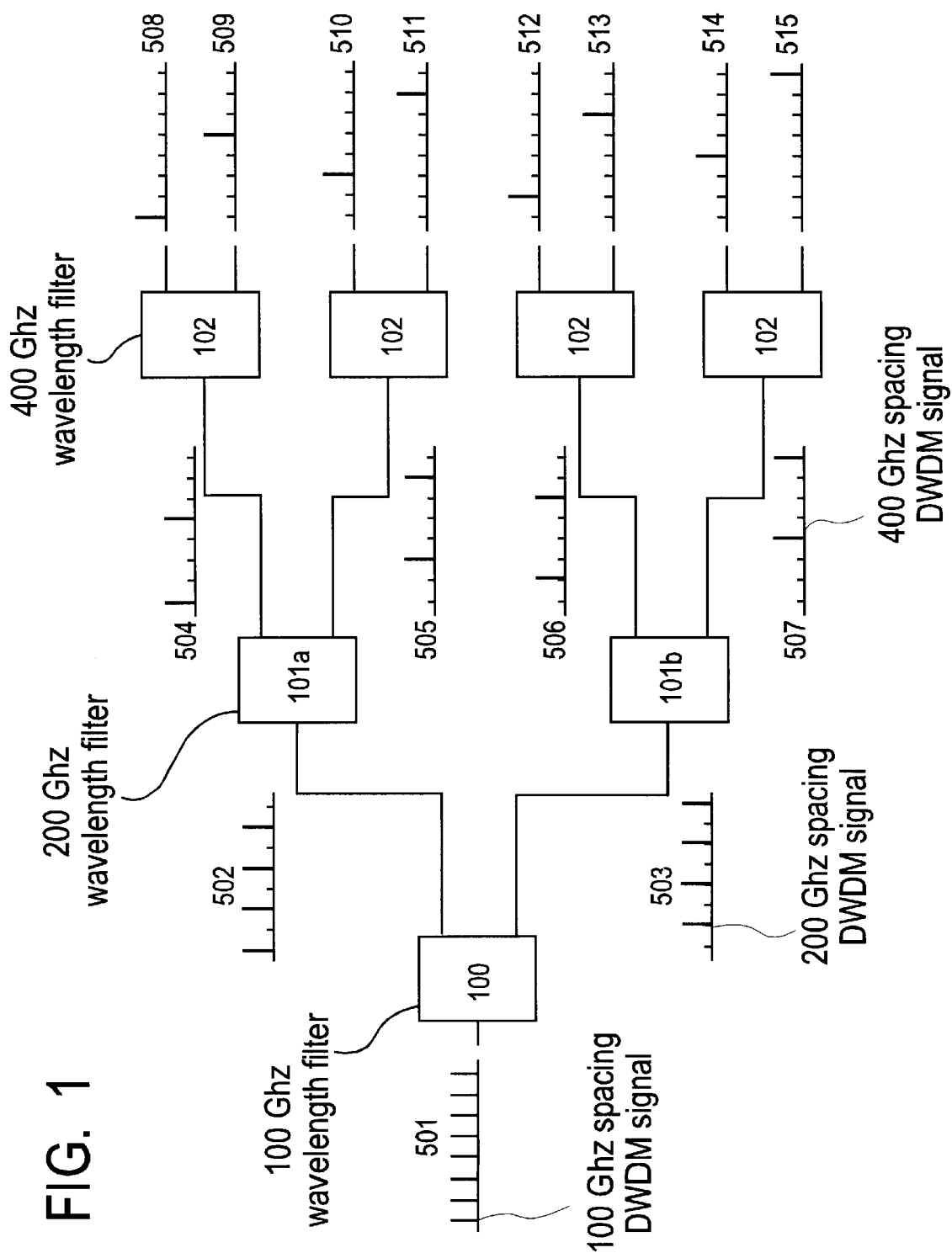
FIG. 1 is a block diagram of a three-stage demultiplexer according to an embodiment of the present invention.

In the embodiment depicted in FIG. 1, an 8-channel WDM signal 501 is provided with channels having center frequencies evenly spaced 100 GHz apart. In the illustration of FIG. 1, the horizontal axis 501 represents wavelength and vertical lines represent the position of channel center frequencies. (For example, the center frequencies might be 193.5, 193.6, 193.7, 193.8, 193.9, 194.0, 194.1 and 194.2 terraHertz (THz)).

The WDM signal 501 is received by a wavelength filter according to an embodiment of the present invention 100, which outputs first and second signals 502, 503. If we assign number to the channels, in order, (so that, for example "channel 1" is the channel centered at 193.5 Thz, "channel two" is the channel centered at 193.6 Thz, and so on) output signal 502 contains only the odd-numbered channels (channels 1, 3, 5 and 7, with center frequencies of 193.5, 193.7, 193.9, 194.1 Thz, respectively, in the present example), and the second signal 503 contains only the even-numbered channels (channels 2, 4, 6, 8, with center frequencies of 193.6, 193.8, 194.0 and 194.2 Thz, respectively, in the present example). Accordingly, although all channels have been retained, because of separation of the interdigitated even-numbered and odd-numbered channels, the channel center frequencies in each of the two signals 502, 503 are separated by 200 GHz, i.e., twice the channel separation of the original WDM signal 501.

Figure 3A:
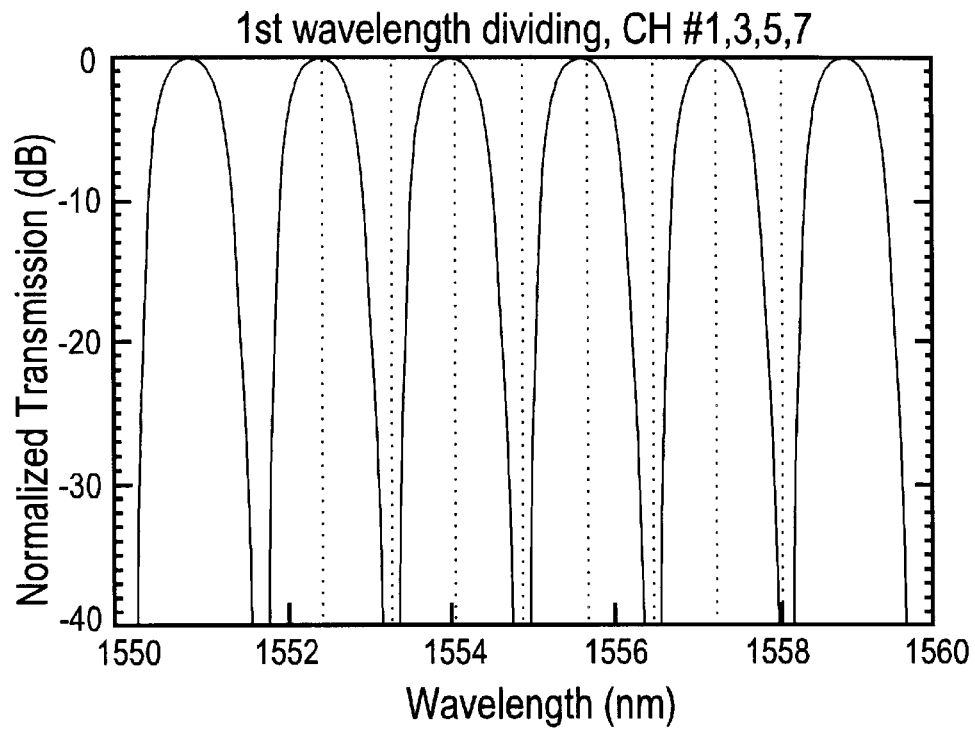
FIGS. 3a–3d depict normalized transmission response across a wavelength band for filters that may be used in connection with the embodiment of FIG. 1.
Figure 3B:
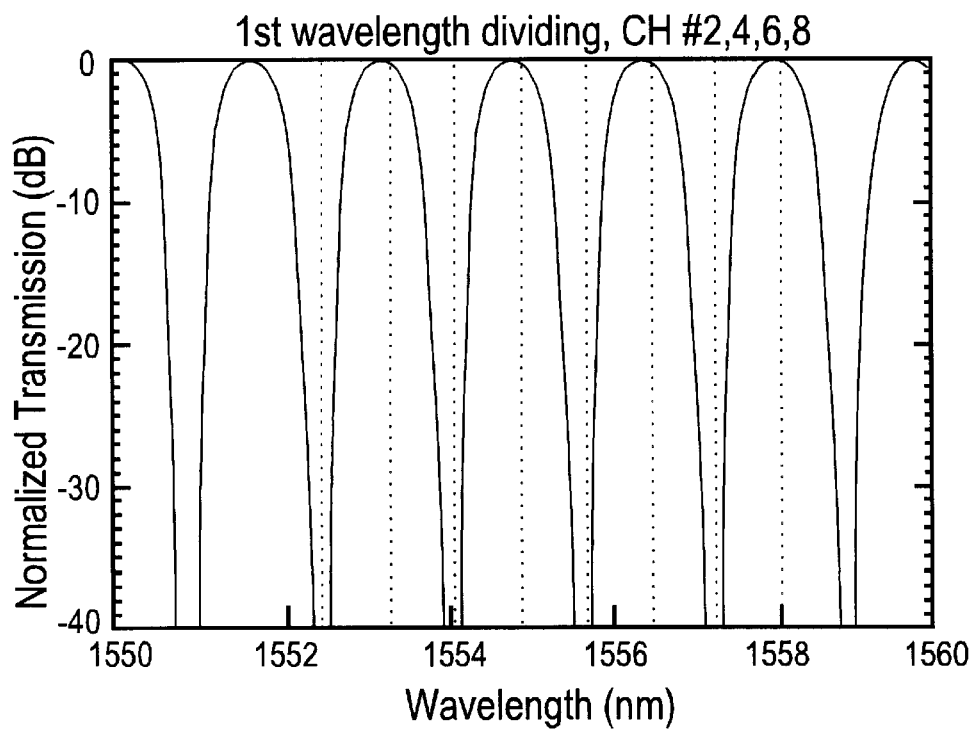

The wavelength filter 100 can be similar to that described in U.S. Pat. No. 5,694,233 and/or as described in Ser. No. 08/739,424 entitled "Programmable Wavelength Router" filed on Oct. 29, 1996, both incorporated herein by reference. However, preferably the wavelength filter 100 is passive and contains no control element or controllable polarization converter. In one embodiment, the wavelength filter 100 includes a first component for providing first and second (different) polarizations to the odd-numbered and even-numbered channels, respectively, and a second component for physically separating (providing different paths) to the differently polarized components. In one embodiment, the first component can be formed from a plurality of wave-plates or birefringent elements. The birefringent elements are oriented at different optic axis angles with respect to one another. FIG. 3a depicts the transmission of the filter 100, according to one embodiment of the invention, for light with a first (e.g. vertical) polarization, and FIG. 3b depicts transmission through the filter of this embodiment for a second (e.g. horizontal) polarization. Preferably the transmission envelopes are shaped to provide sufficient width, as depicted, to tolerate expected wavelength drift while still being sufficiently narrow to achieve the necessary discrimination with respect to other channels. In one embodiment, suitable filters may be made as described in U.S. Pat. No. 5,694,233 titled "Switchable Wavelength Router" and/or U.S. patent application Ser. No. 09/020,706, titled "Temperature Insensitive Polarization Filter", both incorporated herein by reference. Basically, the polarization filter is composed of multiple birefringent elements, each having a certain predefined amount of phase retardation. By orientating these elements in different angles the combined transmission spectrum can be shaped to a square-wave like periodic function. The periodicity of the transmission spectrum can be controlled by increasing or decreasing the amount of phase retardation of the birefringent elements. A simple spectral response 612 of a birefringent element 618 (FIGS. 6B,C) placed between crossed (622a,b) and parallel (616a,b) polarizers is shown in FIG. 6A, where the two orthogonal spectra demonstrate the concept of coding the bandwidth into vertical (channels 1, 3, 5, 7; 614a,c,e,g) and horizontal polarizations (channels 2, 4, 6; 614b,d,f), respectively.

Accordingly, the output of the first component of the filter is a signal in which even-numbered channels have a first polarization and odd-numbered channels have a second polarization. This output is then applied to a device for physically separating the differently-polarized components, such as a polarization beam separator (PBS). One example of a component that may be used is that sold under the model number 05FC16 available from Newport of Irvine, Calif.

Figure 2:
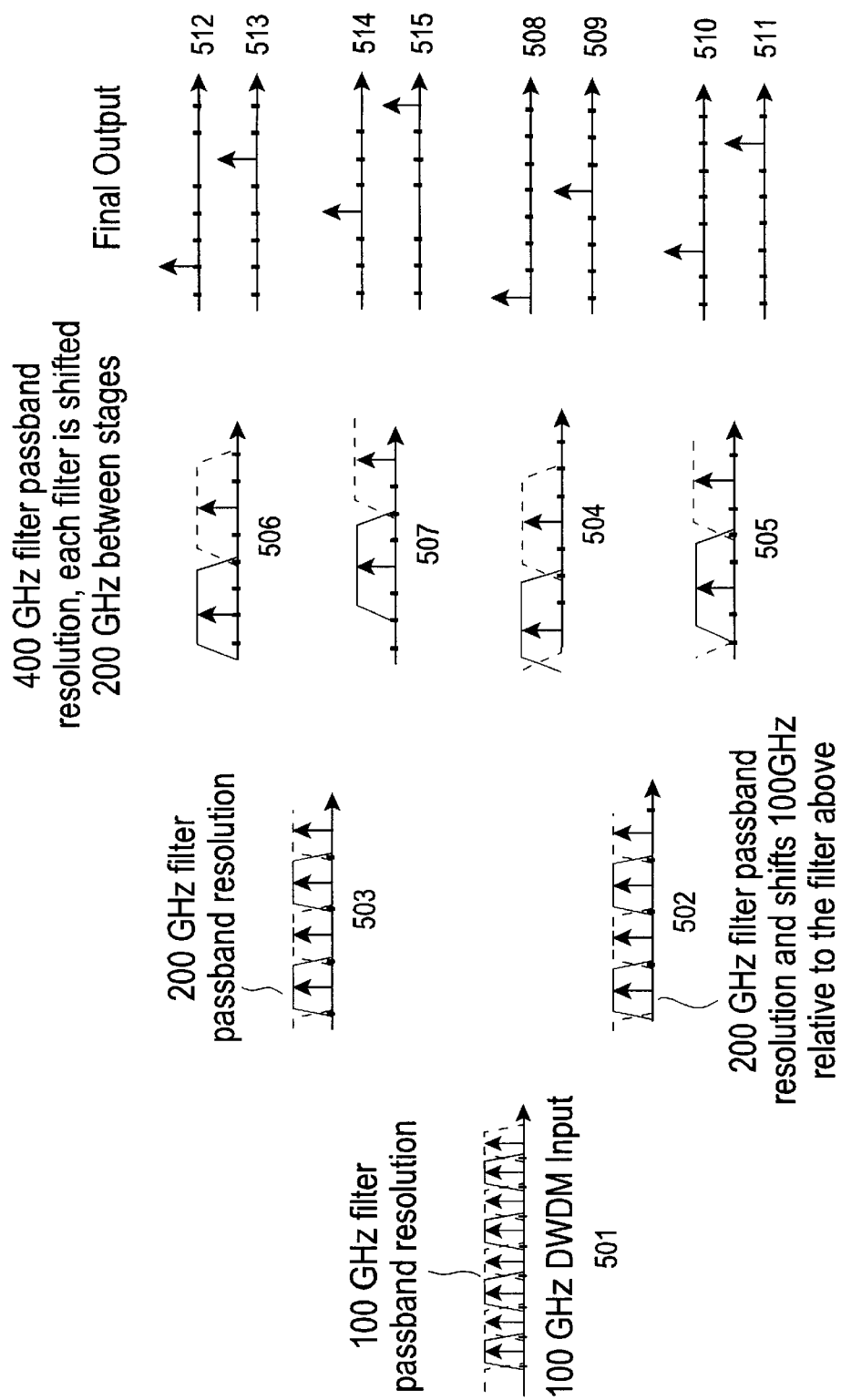
FIG. 2 is a diagram illustrating channel separation of various signals in portions of FIG. 1.
Figure 3C:
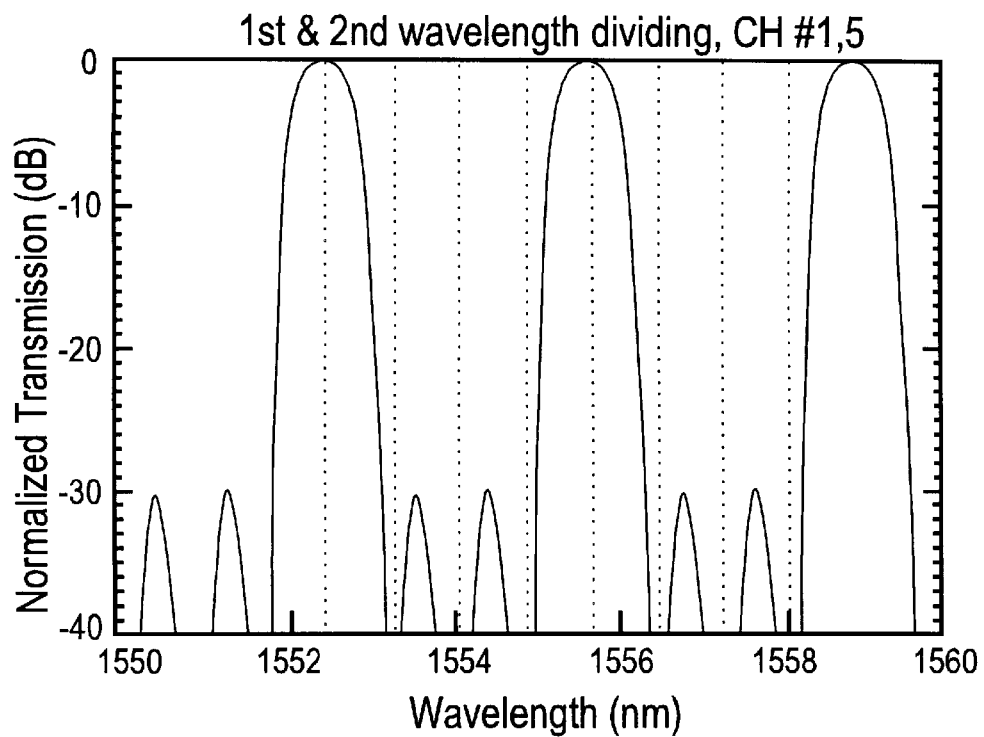
Figure 3D:
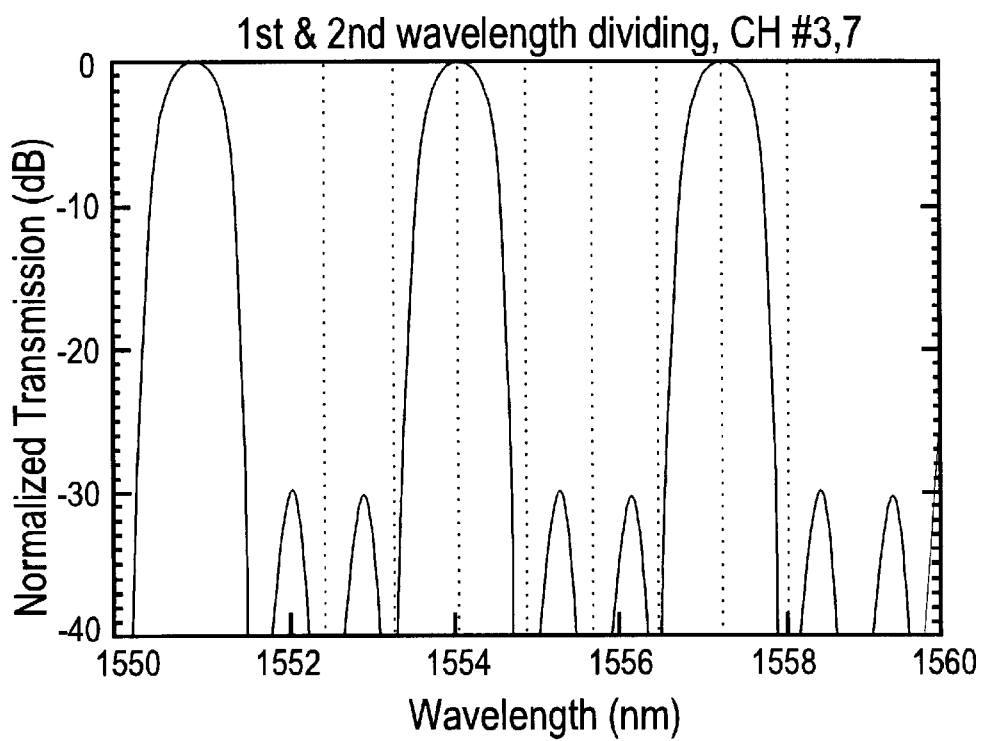

Returning to FIG. 1, and as further illustrated in FIG. 2, the second stage separation involves providing the first stage output signals 502, 503 as input to second stage wavelength filters 101a, 101b respectively. The second stage filters 101a, 101b are similar in nature to the first stage filter 100 but have transmission bands which are spaced apart so as to select or separate every other channel of the input signals 502, 503, i.e., every fourth channel of the original WDM signal 501. FIGS. 3c and 3d (illustrating cascading stages) show transmission characteristics of filter 101a for vertically and horizontally oriented polarized channels which accordingly will act to separate, e.g. channels 1 and 5 from channels 3 and 7. The transmission characteristics for filter 101b will be clear to those of skill in the art after understanding the present disclosure.

Filter 101a will output two signals 504, 505 and filter 101b will also output two signals 506, 507. The second stage output signals 504, 505, 506, 507 will contain channels which are spaced apart by 400 GHz, i.e., twice the channel spacing of the first stage output signals 502, 503 and four times the channel spacing of the original WDM signal. In the present example, signal 504 includes channels centered at 193.5 and 193.9 THz, signal 505 includes channels centered at 193.7 and 194.1 THz, signal 506 includes channels centered at 193.6 and 194.0 THz, and signal 507 includes channels centered at 193.8 and 194.2 THz. Conventional means may be used to separate the two channel, in each of the third stage output signals 504, 506, 505, 507 such as by using a conventional multi-layered dielectric thin-film wavelength filter 102 or, if desired, a wavelength filter as described herein can be used, to provide the fully multiplexed output, i.e. 8 output signals each containing one of the original 8 channels of the original WDM signal 508 through 515.

Figure 4A:
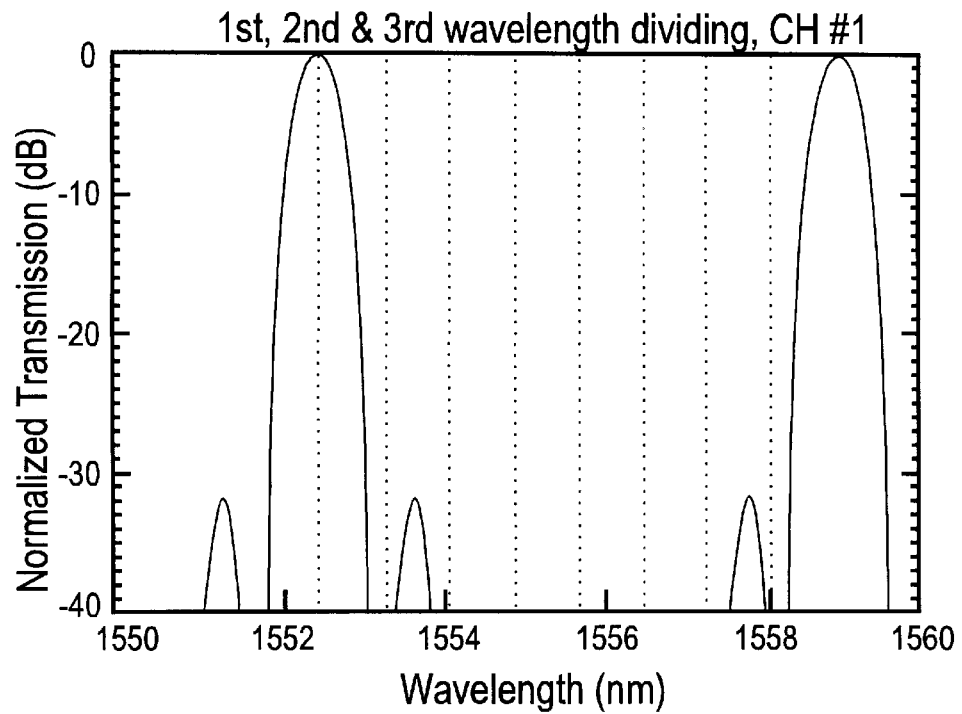
FIGS. 4a and 4b depict transmission response of a filter for separating components.
Figure 4B:
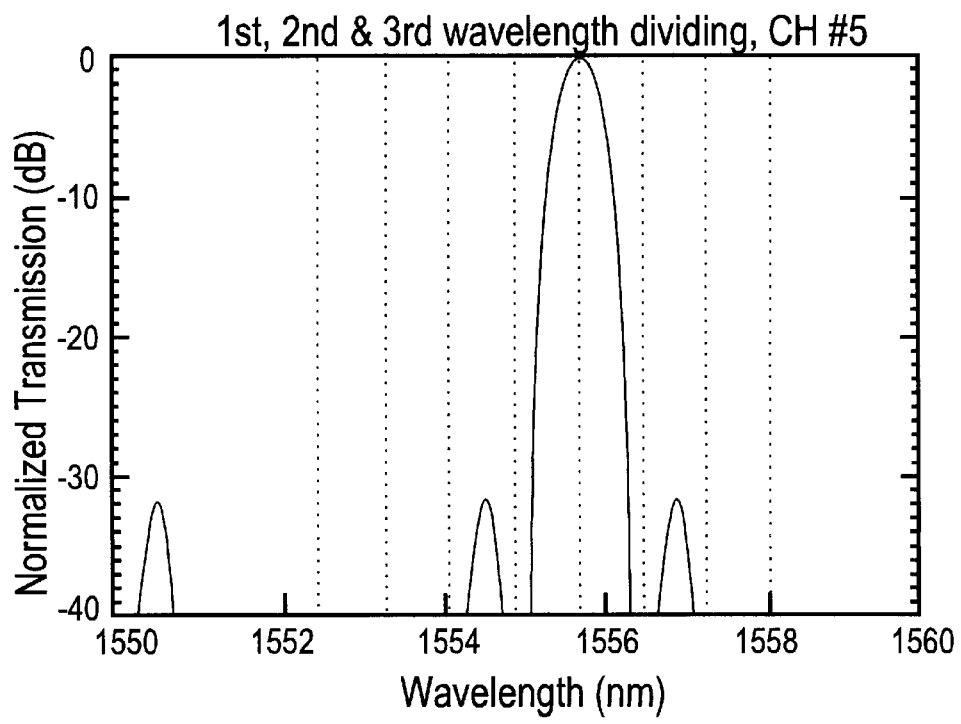

FIGS. 4a and 4b depict transmission characteristics of a filter appropriate for separating components of signal 504, i.e. separating channel 1 from channel 5.

Figure 7:
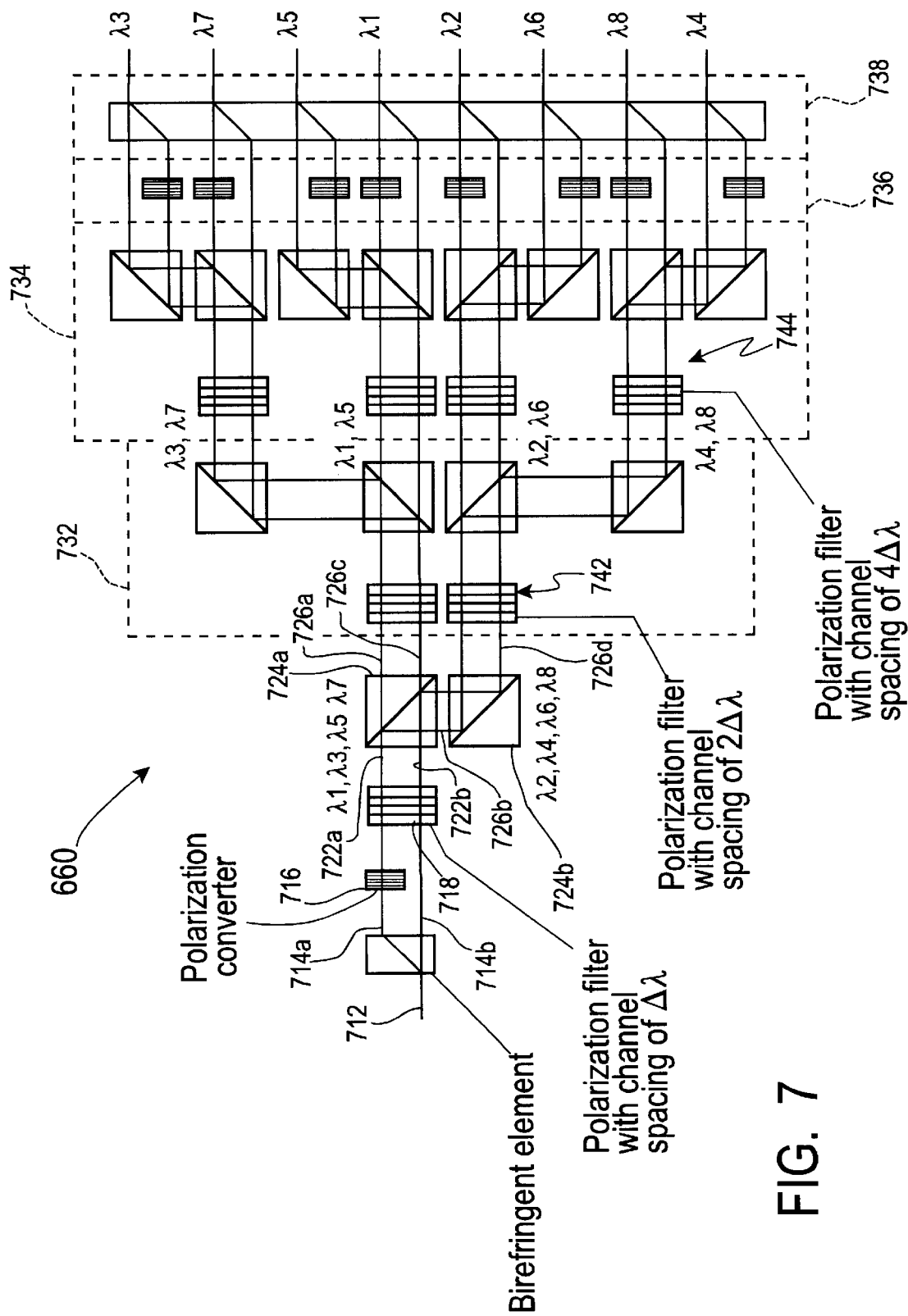
FIG. 7 illustrates a block diagram of an eight-channel demultiplexer/multiplexer according to an embodiment of the present invention.
Figure 8:
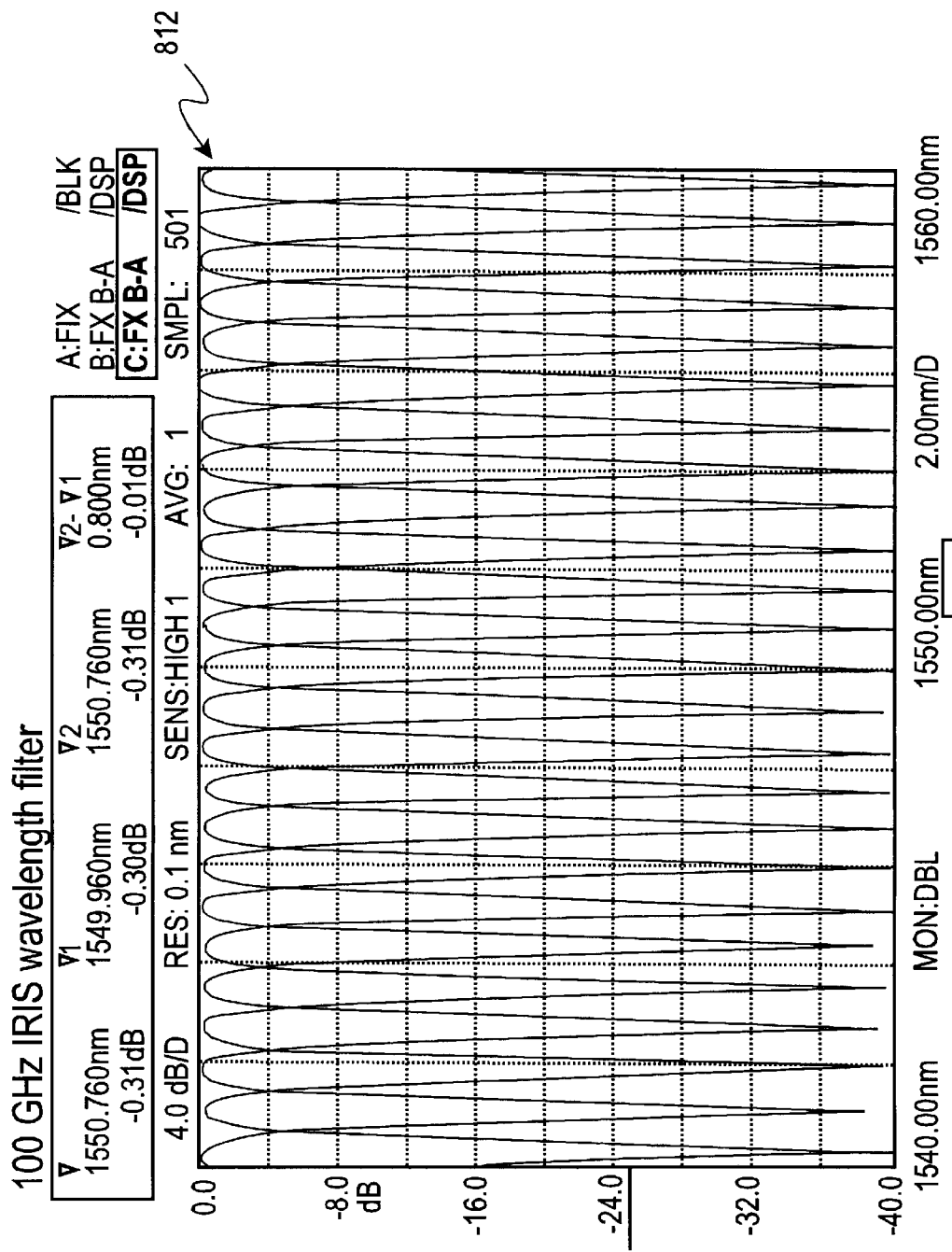
FIG. 8 shows experimental result of a 100 GHz 1×2 demultiplexer, indicating relatively flat-top spectral response has been achieved.

The block diagram of FIG. 7 illustrates the function described above. In the embodiment of FIG. 7, a DWDM signal composed of 8 optical channels 712 is provided to the device 600. The optical signal 712 is decomposed into two orthogonal polarization components, namely, vertical and horizontal polarization, respectively 714a,b. One of the light paths 714a is passed through a polarization converter 716 such that both light paths have the same state of polarization (vertical or horizontal). These two beams then pass through a polarization filter 718 such that the odd-channels are coded with (output in) horizontal polarization and the even channels are coded within vertical polarization. These two polarizations are then separated by the following polarization beam separator (PBS), 724a,b which passes the horizontal polarization 726a,c straight through the PBS and deflects the vertical polarization 726b,d by 90°. Because the odd and even channels reside within the two polarizations respectively, they are spatially separated after the PBS. The same processes are repeated through the next two stages 732, 734 (followed by polarization conversion 736 and recombination 738), except with the filters 742, 744 equipped with broader spectral characteristics, as described. The experimental results of the first stage spectral response 812 is illustrated in FIG. 8, with 100 GHz channel spacing.

According to an embodiment of the present invention, multiplexing can be achieved using components and processes identical to or similar to those described above in connection with a demultiplexer, but operated in reverse order.

Figure 5:
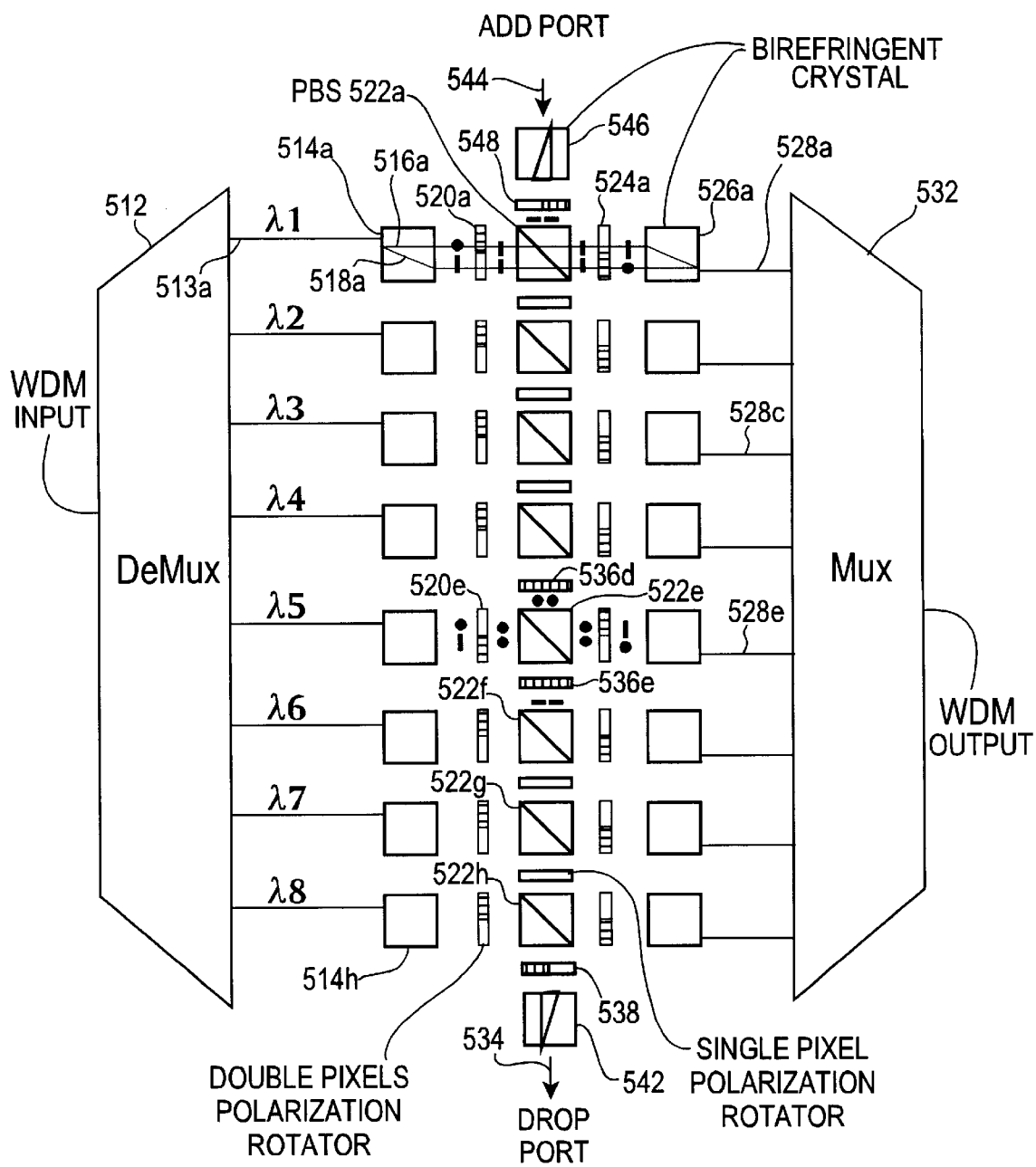
FIG. 5 depicts an add/drop device that can be used in connection with the demultiplexer of FIG. 1.

FIG. 5 depicts an add/drop device according to an embodiment of the present invention which can employ demultiplexer 512 of the type described above. The add/drop device of FIG. 5 can be used in connection with a passive demultiplexer 512 and is able to achieve a change in add/drop functionality (such as a change in the channel to which the add signal is provided) without affecting or interrupting channels which are not involved in the change. The demultiplexer 512 receives, in the depicted embodiment, an 8-channel WDM input and outputs each channel (indicated by $\lambda 1$ through $\lambda 8$), on a separate output line. The eight demultiplexer output signals are provided to, respectively, eight birefringent devices such as birefringent crystals 514a through 514h. The birefringent crystals 514a through 514h separate the vertically and horizontally polarized components of the light which they receive and output a horizontally polarized component 516a (indicated in FIG. 5 by a short line) and a vertically polarized component 518a (indicated in FIG. 5 by a dot) Each of these components is then provided to one of the pixels of a double pixel polarization rotator 520a. Each pixel of the double pixel rotator will, when active (indicated, in FIG. 5 by shading), rotate light by 90° (i.e., rotate horizontal polarization to vertical polarization and rotate vertical polarization to horizontal polarization). The double pixel polarization rotators are controllable, preferably so that either the top pixel or the bottom pixel (but not both) (in the view of FIG. 5) is active. In the configuration depicted in FIG. 5, the uppermost input double pixel polarization rotator 520a has been controlled so that the upper pixel is active and the bottom pixel is nonactive and, as a result, both the upper and lower beams exiting the double pixel polarization rotator 520a are horizontally polarized. The two horizontally polarized beams are provided to a polarization beam splitter (PBS) 522a. The polarization beam splitter 522a is configured such that horizontally polarized light will pass straight through. Since both beams from $\lambda 1$ reach the polarization beam splitter 522a in a horizontal polarization, both beams pass straight through. A second (output) double pixel polarization rotator (524a, configured oppositely to 520a, with the active pixel on the bottom) and a second birefringent crystal 526a act to recombine the beams so that, in the configuration of FIG. 5, the signal reaching the upper input line 528a of the multiplexer 532 is identical to the upper output line 513a of the demultiplexer 512. Thus in the configuration of FIG. 5a, with respect to the first channel, the device acts as or provides a bridge function.

The configuration of the components associated with the second through fourth and sixth through eighth channels ($\lambda 2$ through $\lambda 4$, $\lambda 6$ through $\lambda 8$) are controlled to be identical to that of the first channel, $\lambda 1$, and the signals on the input lines of the multiplexer 532, for these channels, are all substantially identical to the corresponding output lines from the demultiplexer 512, providing a bridge function for these channels as well. As seen in FIG. 5, however, the double pixel polarization rotator associated with the fifth channel $\lambda 5$ 520e has been controlled so that the upper pixel is inactive and the lower pixel is active. As will be seen below, the effect (combined with other controlled elements described below) is to divert the fifth channel signal $\lambda 5$ to the drop port 534. As seen in FIG. 5, the effect of changing the configuration of the fifth channel double pixel polarization rotator 520e is that both output beams will have a vertical polarization (indicated by dots in FIG. 5). The corresponding polarization beam splitter 522e reflects the vertical polarized light downward through an (active) single pixel polarization rotator 536e which converts the light to horizontal polarization. The horizontally polarized light accordingly passes straight through (downward in the view of FIG. 5) the subsequent polarization beam splitters 522f, g, h and the horizontally polarized beams (originating from channel λ5) reach a beam combiner made up of a controllable double pixel polarization rotator 538 and a birefringent crystal 542 to combine the beams so that the drop port 534 outputs a signal identical to the fifth channel signal λ5.

In the configuration of FIG. 5, the device is further configured so that a signal provided to the add port will be sent to the fifth input line of the multiplexer 528e. The signal from the add port 544 passes through a birefringent crystal 546 and a double pixel rotator 548 to provide two beams both of which are horizontally polarized. These beams pass through the first four polarization beam splitters 522a through 522d and through the first three single pixel polarization rotators (which are, in the configuration of FIG. 5, controlled to be inactive 536a,b,c). The fourth single pixel polarization rotator, however, 536d is controlled to be active and accordingly, the beams output (downward) from a fourth single pixel polarization rotator 536d are vertically polarized. This results in the fifth polarization beam splitter 522e reflecting the add port signal to the right (in the view of FIG. 5) where the two beams are recombined (by double pixel polarization rotator 524e and birefringent crystal 526e) to provide a recombined add signal at the fifth input 528e of the multiplexer 532.

If it was desired to change the add/drop configuration such that the add signal was sent to the third multiplexer input 528c and the third demultiplexer output λ3 was sent to the drop port 534, this would be achieved by switching the configuration of the third and fifth input double pixel polarization rotators 520c, 520e, the third and fifth output double pixel polarization rotators 524c,d inactivating the single pixel rotators before and after the fifth polarization beam splitter 536d, 536e and activating the single pixel polarization rotators before and after the third polarization beam splitter 536b,c. As can be seen from this example, changing the add/drop configuration in this manner will affect (and possibly interrupt) the channels directly involved in the change, i.e. channels 3 and 5, but will have no effect on the remaining channels 1, 2, 4, 6, 7 and 8 so that signal transmission can remain substantially continuous on those channels.

Figure 9:
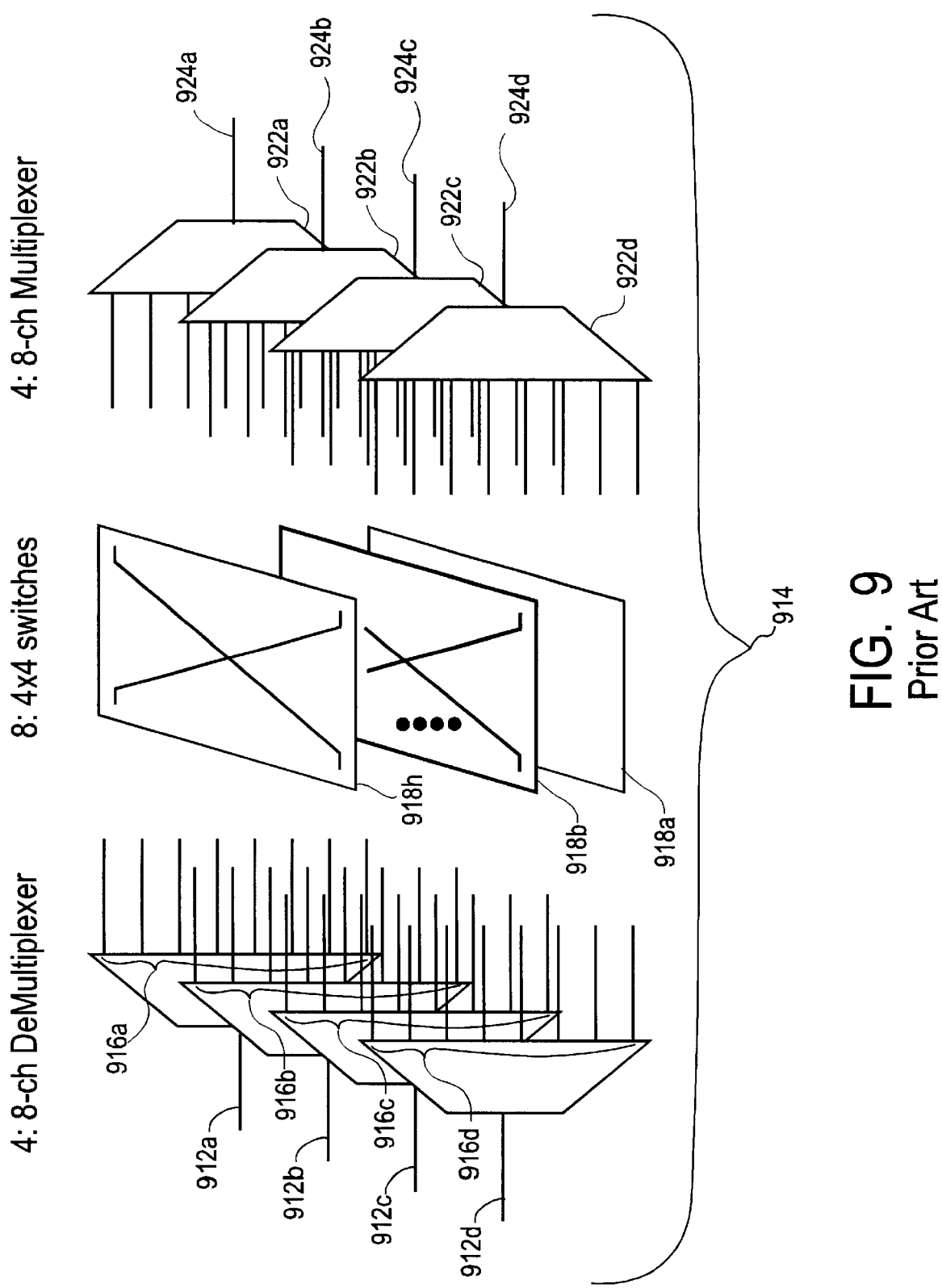
FIG. 9 depicts an application using a multiplexer according to an embodiment of the present invention for optical crossconnect.

FIG. 9 illustrates an application for a multiplexer. Four fibers 912a–d each carrying an 8-channel DWDM optical signal enter the optical node 914 for wavelength exchange. The DWDM signals are first demultiplexed to form four sets 916a–d of eight separated wavelengths. Each of the $\lambda_i$, i=1 to 8 (four each), is input to one of eight 4×4 optical switches 918a,b,c,d,e,f,g,h, such that they can be exchanged or rerouted to a designated output multiplexer 922a–d and exit to the output fibers 924a–d.

Figure 10:
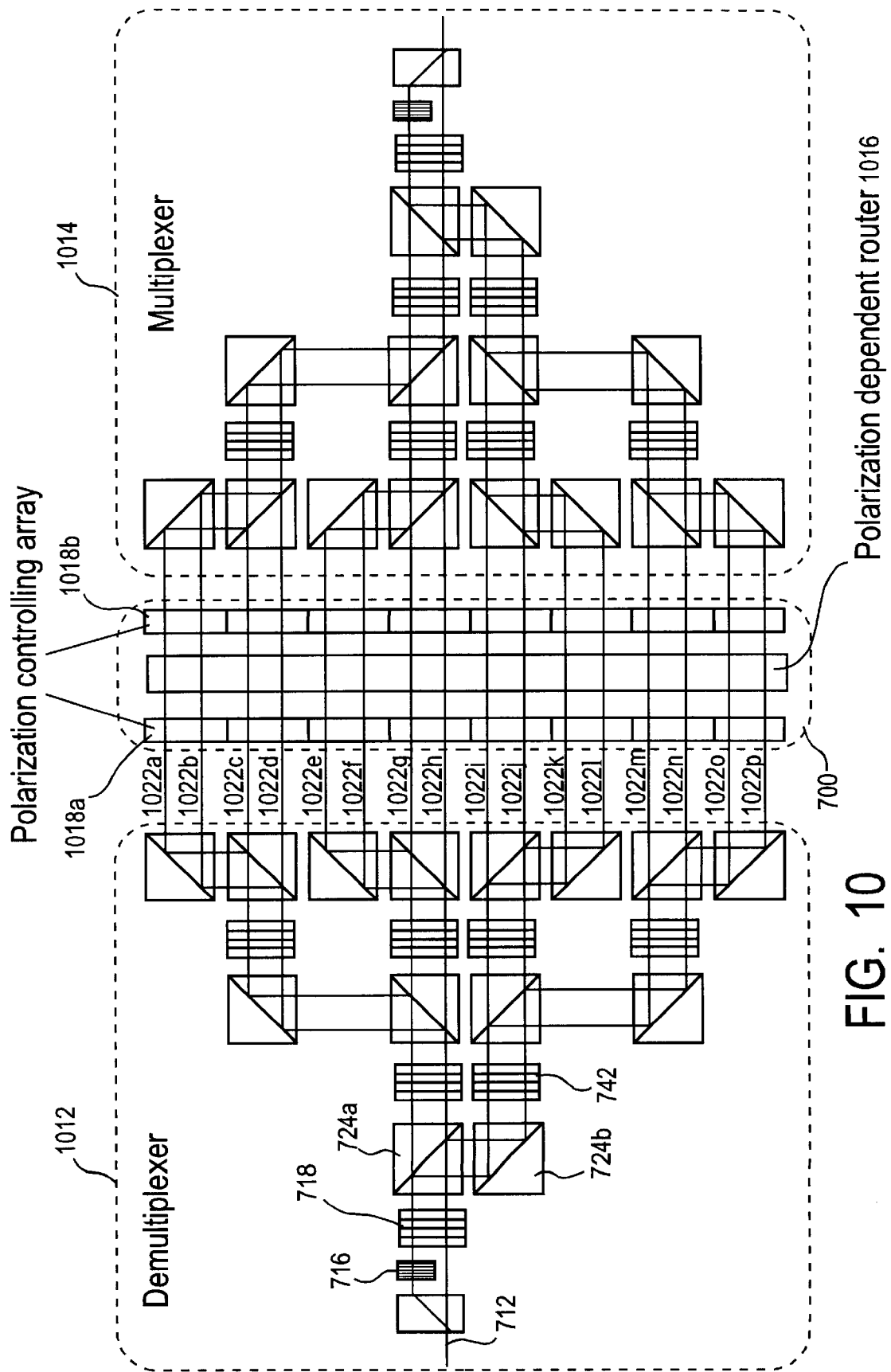
FIG. 10 is a schematic plan view of a programmable wavelength add/drop multiplexer according to an embodiment of the present invention.
Figure 12:
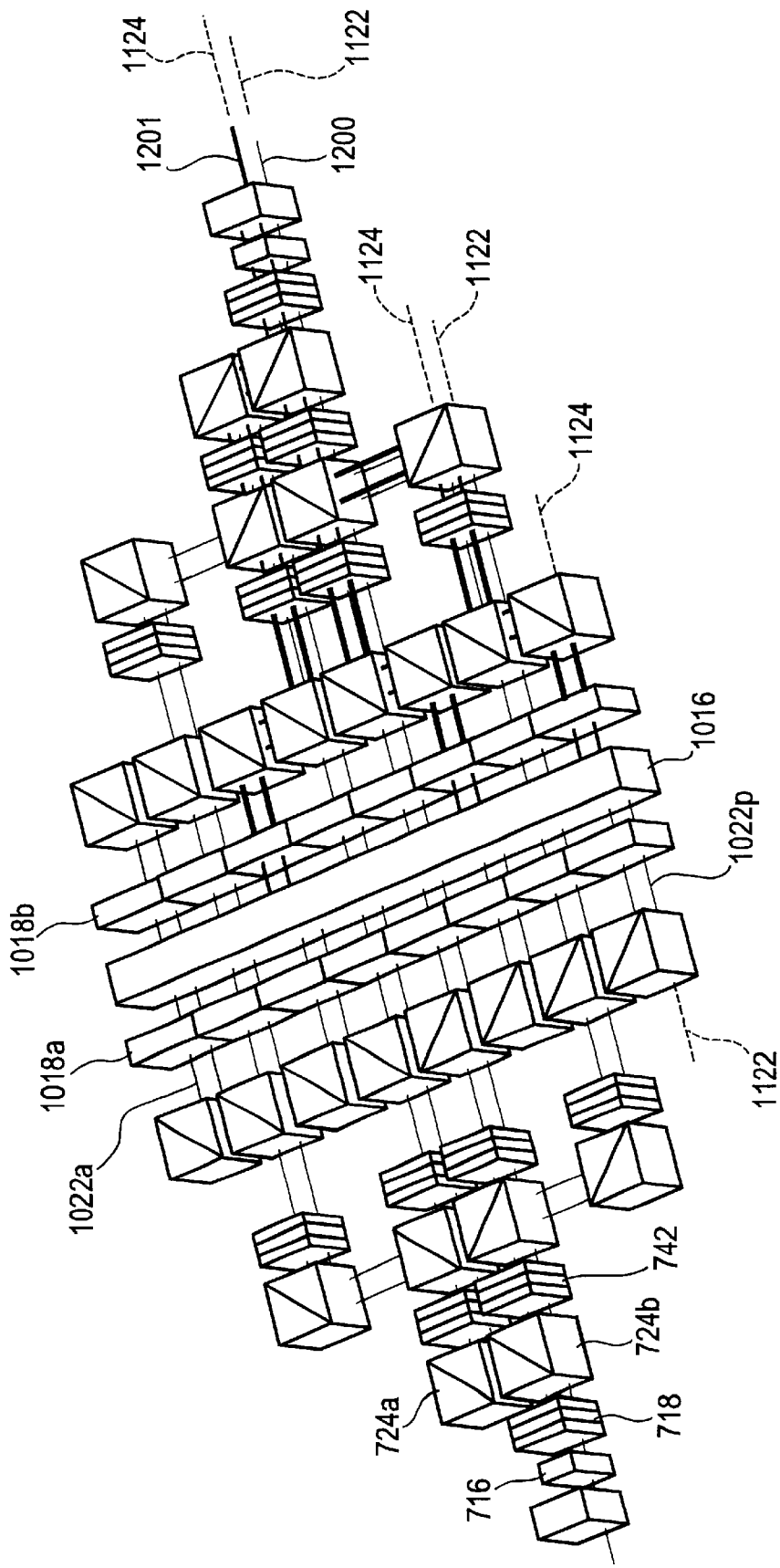
FIG. 12 is a perspective view of the programmable wavelength add/drop multiplexer of FIG. 10.

FIGS. 10 and 12 illustrate in plan and perspective views, respectively, a new architecture for a programmable wavelength add/drop multiplexer based on the multiplexer and demultiplexer shown in FIG. 7. In FIG. 10, multiplexer/demultiplexer 1012, 1014 are configured similarly to the device 600 depicted in FIG. 7, but shown with the last polarization converter array and the final birefringent element removed. In between the demultiplexer 1012 and multiplexer 1014, a polarization dependent router 1016, coupled to two polarizations controlling arrays 1018a,b is inserted to perform the wavelength routing function. At each output of the demultiplexer, optical channels are spatially separated with each assigned to have either vertical 1022a,b,e,f,i,j,m,n or horizontal 1022c,d,g,h,k,l,o,p polarization.

Figure 11B:
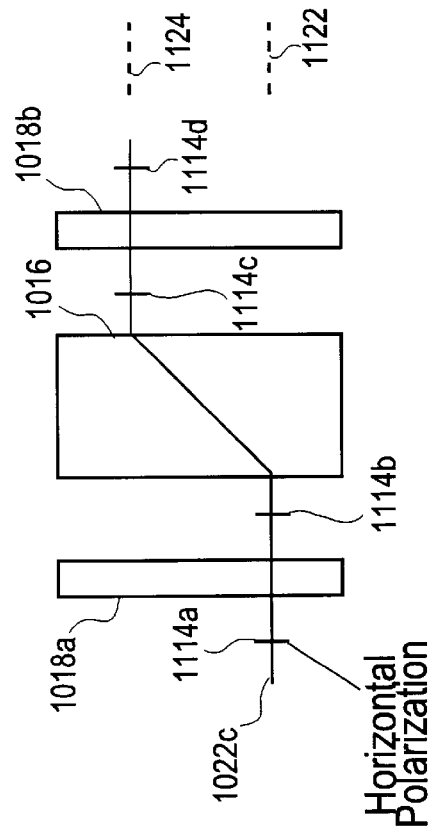
FIG. 11 is a side view of a portion of the programmable wavelength add/drop multiplexer illustrated in FIG. 10.
Figure 11D:
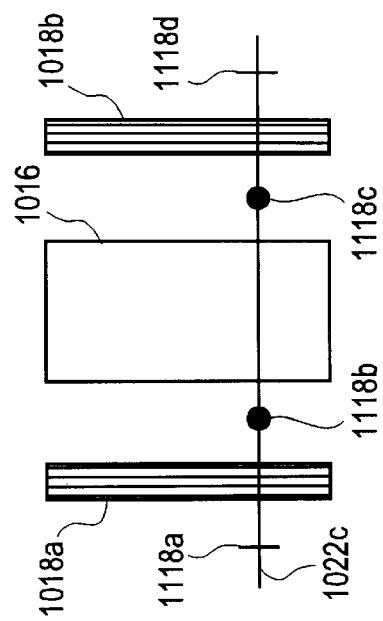
Figure 11A:
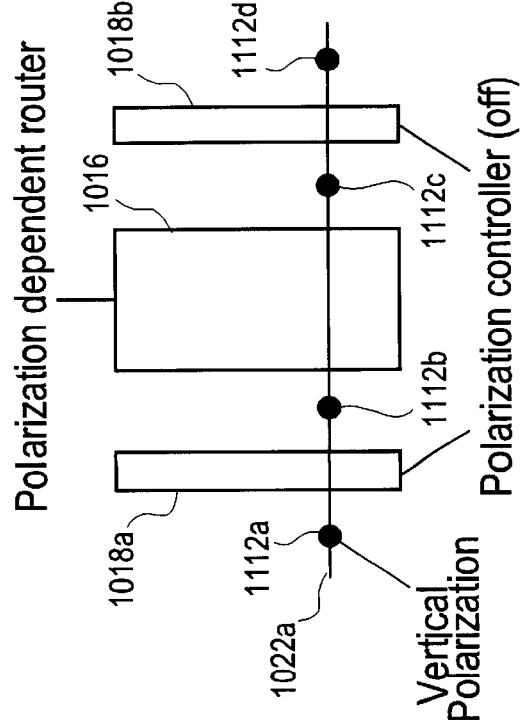
Figure 11C:
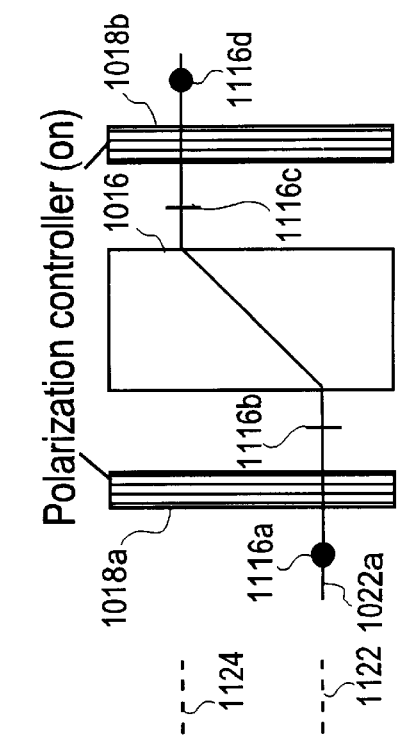

As can be seen in the partial side view of elements of the central component 700, provided in FIGS. 11A–D, the optical paths can be altered by controlling the polarization of the lightwave through the polarization controlling array and the following polarization dependent router. Therefore, an individual channel can be selected to route to upper (FIGS. 11B,C) or lower (FIGS. 11A,D) levels depending on the polarization router 700. In the views of FIGS. 11A–D, the beam displacer 1016 is configured such that, upon receiving a beam with vertical polarization (indicated, in FIGS. 11A,D by dots 1112b, 1118b) the beam is passed straight through, but upon receiving a beam with horizontal polarization (indicated in FIGS. 11B,C by a short line 1114b, 1116b), the beam is deflected upward from a lower level 1122 to an upper level 1124. FIGS. 11A–D illustrate use of polarization controllers 1018a, 1018b to achieve routing. In FIG. 11A, the first polarization rotator 1018a is in an inactive or off state so that, upon receiving a vertically polarized beam 1022a, the beam is passed on with the same (vertical) polarization to the displacer 1016, which passes the beam straight through. When it is desired to route the vertical polarized beam 1022a to the upper level 1124, the first polarization rotator 1018a is switched (e.g. in response to a control bit) to an active or on state which, as shown in FIG. 11C changes the vertical polarization 1116a to horizontal polarization 1116b. As described above, the displacer 1016 responds to input of a horizontally polarized beam by displacing it to the upper level 1124, as depicted in FIG. 11C. Preferably a second polarization controller 1018b changes the horizontally polarized beam 1116c back to the original (vertical) polarization 1116d (e.g. to facilitate beam recombination at a later stage). Similarly, although a horizontally polarized beam 1022c is displaced to the upper level 1124 (thick lines in FIG. 12) when the polarization controller 1018a is off (as shown in FIG. 11B), when it is desired to avoid such displacement (e.g. for routing purposes), the corresponding section or pixel of the first polarization controller 1018a is put in an on state, as depicted in FIG. 11D, to change the horizontal polarization 1118a to vertical polarization 1118b, thus avoiding displacement in the polarization beam displacer 1016. Preferably, a second polarization controller is activated to return the beam to its original (horizontal) polarization 1118d (e.g. to facilitate beam recombination, at a later stage). In this arrangement any or all of the 8 input optical channels can be selectably (programmably) routed individually to either the upper 1124 or lower level 1122 and exit at the two output parts 1200, 1201 of the multiplexer as shown in FIG. 12.

In light of the above description, a number of advantages of the present invention can be seen. The present invention makes it feasible to provide demultiplexing and/or multiplexing functions with respect to relatively narrow bandwidth channels such as channels with center frequencies separated by 100 GHz, 50 GHz or less. The present invention provides for optical channel demultiplexing with reduced risk or incidence of cross-talk and frequency drift. The present invention provides demultiplexing which is substantially scalable, such as providing for demultiplexing arbitrarily small channel bandwidths by adding additional channel separating stages. The present invention provides for an effective optical channel demultiplexer which is entirely or substantially passive, preferably requiring no control and no power. The present invention enables manipulation of channels such as dynamic add/drop manipulation while avoiding affecting, interrupting, or otherwise perturbing channels which are not involved in the change. The arbitrarily dynamic add/drop operation is believed to be not widely available (if at all) in existing devices. A double staged polarization routing element is believed to provide the potential for a high contrast ratio for the optical signal routing. For example, two or more stages might be used to reduce channel cross-talk below that which would be typical for a single-staged polarization routing element (which might result in channel cross-talk of, e.g., about 20 dB.)

A number of variations and modifications of the present invention can be used. Although a single stage filter is presented in the device illustrated in FIGS. 10–12, a double stage (or more) filter design can further shape the transmission function to obtain better channel isolation. A double stage design in this context will be understood by those of skill in the art after reviewing the present specification and/or U.S. Pat. No. 5,694,233. Although examples and illustrations have been provided showing devices that involve demultiplexing a WDM signal with 8 channels separated by 100 GHz, it is possible to use some or all features of the present invention in connection with other types of WDM signals such as signals having more or fewer channels, signals with wider or narrower channel separation, signals with unequal channel separation or channel bandwidth and the like. Although the description includes a filter which separates all even numbered channels from all odd-numbered channels, other wavelength filter configurations can be provided such as those which separate every third, fourth or higher numbered channel from remaining channels, wavelengths which separate some but not all even-numbered channels from remaining channels and the like.

Conventionally, it is very difficult to (e.g. individually) separate the closed DWDM optical channels (using, e.g. conventional filtering techniques), especially when the channel spacing is on the order of 50 GHz (0.4 nm at 1550 nm window). The inter-digitation separation technique described herein solves this difficulty by effectively increasing the channel separation as the DWDM signal passes through each of the filters. After (preferably 2 or more) stages of separation, the channel spacing is far enough (~200 GHz or 400 GHz spacing) that the final channel separation can be achieved through conventional filtering techniques, if desired.

Although a stacked waveplate device for providing alternating channels with different polarizations has been described, other devices can be used for this purpose such as polarization fiber, e.g. panda fiber and bow-tie fiber can be used. A single waveplate element (e.g. as illustrated in FIGS. 6B and 6C) is typically less expensive than a stacked waveplate device, but results in transmission lobes which are sinusoidally shaped (FIG. 6A), rather than the generally more desirable flatter-topped lobes which can be achieved with stacked waveplates. Although liquid crystal controllable polarization rotators have been described, other controllable polarization rotators can be used such as magnito-optic or electro-optic polarization rotators. Although polarization beam splitters have been described in connection with an add/drop and other implementations, other devices for changing beam direction based on polarization can be used such as polarization beam displacers. Although a multiplexer has been described which is substantially identical to the demultiplexer (but in reverse order), it is possible to use the demultiplexer of the present invention in connection with other types of multiplexers (such as multilayers dielectric thin-fiber filters or grating base filters) or without a corresponding multiplexer.

While the application has been described by way of a preferred embodiment and certain variations and modifications, other variations and modifications can also be used in the invention being defined by the following claims:

What is claimed is:

1. Apparatus for demultiplexing an optical DWDM signal having multiple channels, comprising:
    a first filter which receives said DWDM signal and, substantially simultaneously, provides a first signal including a first plurality of said multiple channels in a first polarization and provides a second signal including a second plurality of said multiple channels, different from said first plurality, in a second, different polarization;
    a first polarization displacer which receives said first and second signals and displaces the path of said second signal with respect to the path of said first signal.

2. Apparatus as claimed in claim 1 wherein said first plurality of channels includes every other channel of said multiple channels in said DWDM signal.

3. Apparatus, as claimed in claim 1, wherein said DWDM signal has a first channel spacing and wherein the channel spacing in said first and second signals is about twice said first channel spacing.

4. Apparatus, as claimed in claim 1 further comprising:
    a second filter which receives said first signal and provides a third signal including a third plurality of channels, all of which are within said first plurality of channels, in said first polarization and provides a fourth signal including a fourth plurality of channels, all of which are within said first plurality of channels, said fourth plurality being different from said third plurality, said fourth signal being in said second polarization;
    a second polarization displacer which receives said third and fourth signals and displaces the path of said fourth signal with respect to the path of said third signal;
    a third filter which receives said second signal and provides a fifth signal including a fifth plurality of channels, all of which are within said second plurality of channels, in said first polarization and provides a sixth signal including a sixth plurality of channels, all of which are withing said second plurality of channels, said sixth plurality being different from said fifth plurality, said sixth signal being in said second polarization; and
    a third polarization displacer which receives said fifth and sixth signals and displaces the path of said sixth signal with respect to the path of said fifth signal.

5. Apparatus as claimed in claim 4 wherein said third plurality of channels includes every other channel of said first plurality of channels.

6. Apparatus as claimed in claim 4 wherein said fifth plurality of channels includes every other channel of said second plurality of channels.

7. Apparatus, as claimed in claim 4, wherein said DWDM signal has a first channel spacing and wherein channel spacing in said third, fourth, fifth and sixth signals is about four times said first channel spacing.

8. Apparatus, as claimed in claim 1, further comprising a conventional wavelength filter for receiving at least one of said first and second signals and outputting at least one spatially distinctive single-channel signal.

9. Apparatus, as claimed in claim 4, further comprising a conventional wavelength filter for receiving at least one of said third, fourth, fifth and sixth signals and outputting at least one spatially distinctive single-channel signal.

10. Apparatus for demultiplexing an optical DWDM signal having multiple channels, comprising:
    a first means, for receiving said DWDM signal and providing a first signal including a first plurality of said multiple channels in a first polarization and a second signal including a second plurality of said multiple channels, different from said first plurality, in a second, different polarization;

means for displacing the path of said second signal with respect to the path of said first signal.

11. Apparatus, as claimed in claim 10, further comprising:

means for receiving said first signal and outputting relatively displaced third and fourth signals with different polarizations, said third and fourth signals each containing different channels selected from said first signal; and means for receiving said second signal and outputting relatively displaced fifth and sixth signals with different polarizations, said fifth and sixth signals each containing different channels selected from said second signal.

12. Apparatus for demultiplexing or multiplexing comprising:

means for dividing an optical signal having a first channel spacing into at least first and second signals, each having a channel spacing about twice said first channel spacing, wherein said first signal includes a first plurality of channels in a first polarization, wherein said second signal includes a second plurality of channels in a second polarization, and wherein said first polarization is different from said second polarization;

means for inputting a multi-channel optical signal to said means for dividing.

13. Apparatus, as claimed in claim 12, further comprising means for receiving at least one of said first and second signals and providing spatially separated single-channel outputs.

14. Apparatus, as claimed in claim 13, wherein said means for receiving includes means for dividing said at least one of said first and second signals into at least third and fourth signals, each having a channel spacing about twice a channel spacing of said at least one of said first and second signals.

15. Apparatus, as claimed in claim 13, wherein said means for receiving includes a conventional wavelength filter.

16. A method for demultiplexing an optical DWDM signal having multiple channels, comprising:

receiving said DWDM signal;

substantially simultaneously, providing a first signal including a first plurality of said multiple channels in a first polarization and providing a second signal including a second plurality of said multiple channels, different from said first plurality, in a second, different polarization;

displacing the path of said second signal with respect to the path of said first signal.

17. A method for increasing channel separation in a DWDM signal comprising:

receiving a plurality of input channels defining a first channel spacing;

substantially simultaneously providing a first polarization to a first plurality of input channels and a second polarization to a second plurality of input channels;

relatively displacing said first plurality of input channels from said second plurality if input channels, wherein channel spacing in each of said first plurality and said second plurality of channels is about twice said first channel spacing.

18. A method, as claimed in claim 17 further comprising repeating said steps of providing said first and second polarizations and relatively displacing until a desired channel separation is achieved.

19. A method as claimed in claim 17 further comprising repeating said steps of providing said first and second polarizations and relatively displacing until at least a first of said multiple channels is provided on a path different from remaining ones of said multiple channels.

20. A method as claimed in claim 17 further comprising repeating said steps of providing said first and second polarizations and relatively displacing until all of said multiple channels are provided on separate paths.

21. An optical add/drop device comprising:

a demultiplexer which receives a multi-channel optical input having a first channel spacing and separates said input into even and odd channel signals, each with a channel spacing twice said first channel spacing, wherein said even channel signals have a first polarization, wherein said odd channel signals have a second polarization, and wherein said first and second polarizations are different, and further outputs each channel on a different path, wherein said channels contain both vertically and horizontally polarized components upon being output from said demultiplexer;

a birefringent device arrangement to divide each channel into relatively displaced vertically and horizontally polarized components;

a first plurality of controllable polarization rotators for receiving each of said vertically and horizontally polarized components of each channel, controlled to rotate polarization of one of said components for each channel to output, for each channel, two signals in the same polarization;

a plurality of polarization beam splitters, with one such beam splitter positioned adjacent each channel path, configured to pass signals in a first polarization substantially straight through and to displace signals in a second polarization 90 degrees;

a controllable polarization rotator between each of said plurality of beam splitters, controlled to an active state before and after a beam splitter corresponding to a channel where an add/drop function is desired;

an add signal port coupled to a first of said polarization beam splitters by a birefringent crystal for dividing said add signal into vertically and horizontally polarized components, and a controllable polarization rotator, controlled to rotate polarization of one of said components of said add signal to provide two signals in the same polarization;

a drop signal port coupled to a last of said polarization beam splitters by a controllable polarization rotator, controlled to rotate polarization of one of said components of said add signal to provide two signals in different polarizations, and a birefringent combiner;

a second plurality of controllable polarization rotators for receiving first and second components of each channel from said polarization beam splitters, controlled to rotate polarization of one of said components for each channel to output, for each channel, two signals in different polarizations;

a plurality of birefringent combiners for receiving signals from said second plurality of controllable polarization rotators and combining said signals to output a single signal for each channel, each on a different output path; and a multiplexer for combining said output paths to output a plurality of channels on a single WDM output.

22. Apparatus for multiplexing a first plurality of optical signals into a signal having multiple channels, comprising:

a first polarization displacer which receives at least a first pair of optical signals in a first polarization along a first path and a second pair of optical signals in a second, different, polarization along a second path and displaces the path of said second pair of optical signals, respectively, onto said first path to provide a first pair of displacer-output signals and a second pair of displacer-output signals;

means which receives said first and second pair of displacer output signals and, outputs a signal pair which includes said first pair of optical signals and said second pair of optical signals in substantially the same polarization.

23. Apparatus for multiplexing a first plurality of optical signals into a signal having multiple channels, comprising:

means for displacing at least one of first and second differently-polarized optical signals onto a common path;

means for receiving said first and second differently-polarized optical signals on said common path and outputting said first and second signals with the same polarization.

24. A method for multiplexing optical signals comprising:

displacing at least one of first and second differently-polarized optical signals onto a common path; and changing polarization of one of said first and second signals to output said first and second optical signals on a common path with the same polarization.

* * * * *

UNITED STATES PATENT AND TRADEMARK OFFICE
CERTIFICATE OF CORRECTION

PATENT NO. : 6,208,442 B1
DATED : March 27, 2001
INVENTOR(S) : Liu et al.

Page 1 of 1

It is certified that error appears in the above-identified patent and that said Letters Patent is hereby corrected as shown below:

<u>Column 1,</u>
Insert the following:
-- GOVERNMENT INTERESTS

The invention was made with Government support under Contract DARPA II: DAAH01-97-C-R308 awarded by U.S. Army Missile Command, AMSMI-AC-CRAY, Redstone Arsenal, AL 35898. The Government has certain rights in the invention. --

Signed and Sealed this

Thirtieth Day of October, 2001

Attest:

NICHOLAS P. GODICI
Attesting Officer
Acting Director of the United States Patent and Trademark Office